(12) United States Patent
Ito et al.

(10) Patent No.: US 7,679,257 B2
(45) Date of Patent: Mar. 16, 2010

(54) PLANAR COMMUTATOR, ROTOR AND DIRECT CURRENT ELECTRIC MOTOR

(75) Inventors: Yasuhide Ito, Hamamatsu (JP); Tomohiro Aoyama, Kosai (JP)

(73) Assignee: ASMO Co., Ltd., Shizuoka-pref. (JP)

( * ) Notice: Subject to any disclaimer, the term of this patent is extended or adjusted under 35 U.S.C. 154(b) by 70 days.

(21) Appl. No.: 12/071,421

(22) Filed: Feb. 21, 2008

(65) Prior Publication Data

US 2008/0203847 A1    Aug. 28, 2008

(30) Foreign Application Priority Data

Feb. 23, 2007  (JP) ............................. 2007-043724
Feb. 8, 2008   (JP) ............................. 2008-028828

(51) Int. Cl.
*H02K 13/00*   (2006.01)

(52) U.S. Cl. .................. 310/237; 310/268; 310/204

(58) Field of Classification Search ................. 310/237, 310/233, 234, 268, 220, 204
See application file for complete search history.

(56) References Cited

U.S. PATENT DOCUMENTS

| | | | | |
|---|---|---|---|---|
| 3,686,521 | A | * | 8/1972 | Henry-Baudot ............ 310/46 |
| 3,790,835 | A | * | 2/1974 | Takeda ..................... 310/268 |
| 4,701,655 | A | * | 10/1987 | Schmider ................. 310/237 |
| 6,057,623 | A |   | 5/2000 | Tanaka et al. |
| 6,057,626 | A | * | 5/2000 | Tanaka et al. ............. 310/233 |
| 6,181,046 | B1 | * | 1/2001 | Daikoku et al. ........... 310/236 |
| 6,218,755 | B1 | * | 4/2001 | Tanaka et al. ............. 310/204 |
| 2005/0017596 | A1 |   | 1/2005 | Naito et al. |
| 2008/0203847 | A1 | * | 8/2008 | Ito et al. ................... 310/234 |

FOREIGN PATENT DOCUMENTS

| | | | |
|---|---|---|---|
| JP | 11-187622 | A | 7/1999 |
| JP | 2000-060073 | A | 2/2000 |
| JP | 2003079103 | * | 3/2003 |
| JP | 2004-222364 | A | 8/2004 |
| JP | 2004-274971 | A | 9/2004 |
| WO | WO 03/047069 | A1 | 6/2003 |

OTHER PUBLICATIONS

Machine Translation of JP 2003-079103, "Commutator for Motor", Egawa et al., Mar. 14, 2003.*

* cited by examiner

*Primary Examiner*—Karl I Tamai
(74) *Attorney, Agent, or Firm*—Posz Law Group, PLC

(57) ABSTRACT

In a direct current electric motor, segment pieces of a commutator are generally planar and are arranged one after another in a circumferential direction about a rotational axis of the commutator. A slidably engaging surface of each segment piece, which is slidably engageable with a plurality of brushes of the motor, extends in a plane that is generally perpendicular to the rotational axis, and each segment piece includes a radially inner engaging portion at a radially inner end part of the segment piece. Each conductive line extends along a corresponding straight line and electrically interconnects between the radially inner engaging portions of corresponding two of the plurality of segment pieces to implement the same electric potential in the corresponding two of the plurality of segment pieces.

7 Claims, 10 Drawing Sheets

US 7,679,257 B2

PLANAR COMMUTATOR, ROTOR AND DIRECT CURRENT ELECTRIC MOTOR

CROSS REFERENCE TO RELATED APPLICATION

This application is based on and incorporates herein by reference Japanese Patent Application No. 2007-43724 filed on Feb. 23, 2007 and Japanese Patent Application No. 2008-28828 filed on Feb. 8, 2008.

BACKGROUND OF THE INVENTION

1. Field of the Invention

The present invention relates to a planar commutator, a rotor and a direct current electric motor.

2. Description of Related Art

An axial-gap motor, which includes a planar rotor (having a planar commutator) and a planer stator assembled together to oppose each other in a direction of a rotational axis of the planar rotor, is known (see, for example, Japanese Unexamined Patent Publication No. 2004-274971 or PCT Publication No. WO 03/047069 corresponding to US Patent Publication No. 2005/0017596A1).

In a case of a brush electric motor, which has two or more pole pairs (multiple poles), a spark may possibly be generated at a commutator due to voltage unbalance between brushes, which are supposed to have the same electric potential. In order to limit wearing of the brushes caused by the spark or to reduce the number of the brushes, it is known to use equalizing lines, i.e., short-circuit lines (equalizing devices), such as copper wires or copper pieces, to interconnect between corresponding segment pieces of the commutator, which have the same electric potential.

Furthermore, at the time of interconnecting the segment pieces with the equalizing lines, the equalizing lines may possibly contact with each other to cause short-circuiting therebetween or may contact with an armature to cause short-circuiting therewith. Also, at the time of interconnecting the segment pieces with the equalizing lines, the winding operation (fusing operation) may possibly become tedious. Japanese Unexamined Patent Publication No. H11-187622 discloses a technique that addresses the above potential disadvantages. According to this technique, each pair of segment pieces is interconnected by an arcuate short-circuit element on a rear side thereof (a rotational axis side). Then, all of the pairs of segment pieces are placed along a circle, and a dielectric resin material is filled radially inward of the segment pieces to form the commutator.

When the short-circuit elements are placed radially inward of the commutator, the short-circuiting between the equalizing lines or between the equalizing lines and the armature can be limited, and it is not required to perform the tedious winding operation for winding the equalizing lines in the slot of the commutator.

Japanese Unexamined Patent Publication No. 2000-60073 (corresponding to U.S. Pat. No. 6,057,623) discloses another technique. According to this technique, an equalizing device (equalizer) is installed to a rotatable shaft at a location adjacent to the commutator. In the equalizing device, a plurality of annular terminals is stacked over a base member such that a dielectric insulator is interposed between each adjacent two annular terminals. Two equalizing lines, which project radially outward from each terminal, are electrically connected to corresponding two segment pieces by fusing. In this way, the segment pieces, which need to have the same electric potential, are electrically short-circuited. However, in the above technique of Japanese Unexamined Patent Publication No. H11-187622 for integrally forming the commutator and the short-circuit elements by placing the short-circuit elements in the interior of the commutator, the placement of the short-circuit elements in the interior of the commutator may become difficult when the diameter of the commutator becomes small. Also, in the above technique of Japanese Unexamined Patent Publication No. 2000-60073 (corresponding to U.S. Pat. No. 6,057,623) for placing the equalizing device coaxially with the commutator, the segment pieces need to be interconnected by the equalizing lines of the equalizing device by, for example, fusing, thereby requiring the tedious work that causes a reduced work efficiency.

In order to address the above disadvantages, Japanese Unexamined Patent Publication No. 2004-222364 discloses another technique. According to this technique, an end surface dielectric insulator covers an axial end surface of an armature. A plurality of pairs of terminals is provided in the dielectric insulator. Each pair of terminals, which are electrically interconnected with each other, is connected to a corresponding pair of segments pieces through connecting parts of the commutator. With this technique, the connecting operation for connecting the commutator with the short-circuit elements is eased and thereby improving the work efficiency while not being limited by the diameter of the tubular commutator.

However, in a case where the above tubular commutator is applied to the planar motor, there are disadvantages in terms of the axial size, the current density and the slide loss between the brushes and the commutator. Therefore, in the axial-gap electric motor, a planar commutator is often used. In such a case, brushes are engaged with the planar commutator in the axial direction of the axial-gap electric motor and slide over the planar commutator along a plane. In the case of the planar commutator, the equalizing elements are placed below the commutator. Thus, in the case of the motor, which includes the commutator, the short-circuit elements and the planar armature, the thinning of the motor is limited.

SUMMARY OF THE INVENTION

The present invention addresses at least one of the above disadvantages. According to one aspect of the present invention, there is provided a planar commutator for a direct current electric motor. The planar commutator includes a plurality of segment pieces and a plurality of conductive lines. The segment pieces are generally planar and are arranged one after another in a circumferential direction about a rotational axis of the planar commutator. A slidably engaging surface of each segment piece, which is slidably engageable with a plurality of brushes of the direct current electric motor, extends in a plane that is generally perpendicular to the rotational axis, and each segment piece includes a radially inner engaging portion at a radially inner end part of the segment piece. Each conductive line extends along a corresponding straight line and electrically interconnects between the radially inner engaging portions of corresponding two of the plurality of segment pieces to implement the same electric potential in the corresponding two of the plurality of segment pieces.

There may be also provided a rotor, which includes the above planar commutator, an armature and a plurality of windings. Each segment piece of the planar commutator further includes a radially outer engaging portion at a radially outer end part of the segment piece. The armature includes a plurality of core teeth and is placed radially outward of the planar commutator. The windings are wound around the plurality of core teeth. Each winding is electrically connected to the radially outer engaging portion of each corresponding one of the plurality of segment pieces.

There may be also provided a direct current electric motor, which includes the above rotor, a plurality of brushes and at least one planar magnet. The brushes are slidably engageable with the plurality of segment pieces. The at least one planar magnet is radially opposed to the armature.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

First Embodiment

A first embodiment of the present invention will be described with reference to FIGS. 1 to 6. Components and structures described below are not intended to limit the scope of the present invention and may be modified without departing from the spirit and scope of the present invention.

Figure 1:
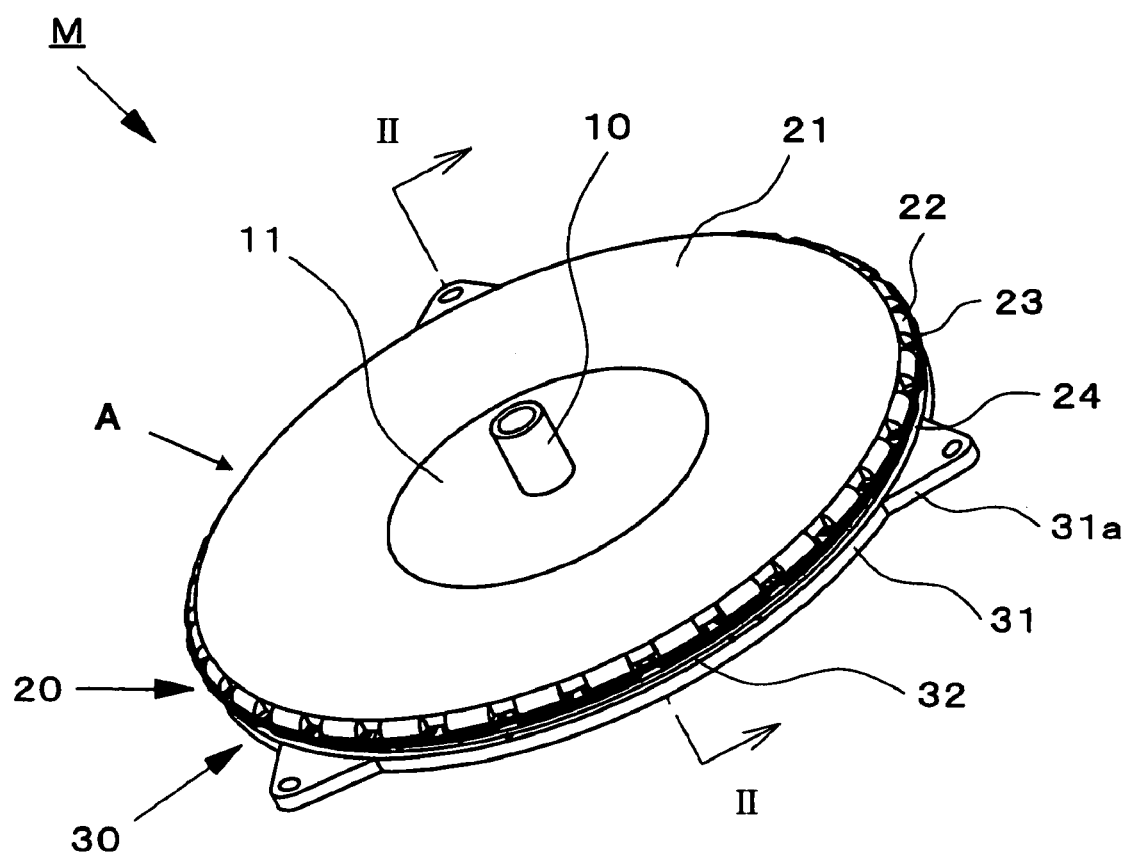
FIG. 1 is a perspective view of a motor according to a first embodiment of the present invention.
Figure 2:
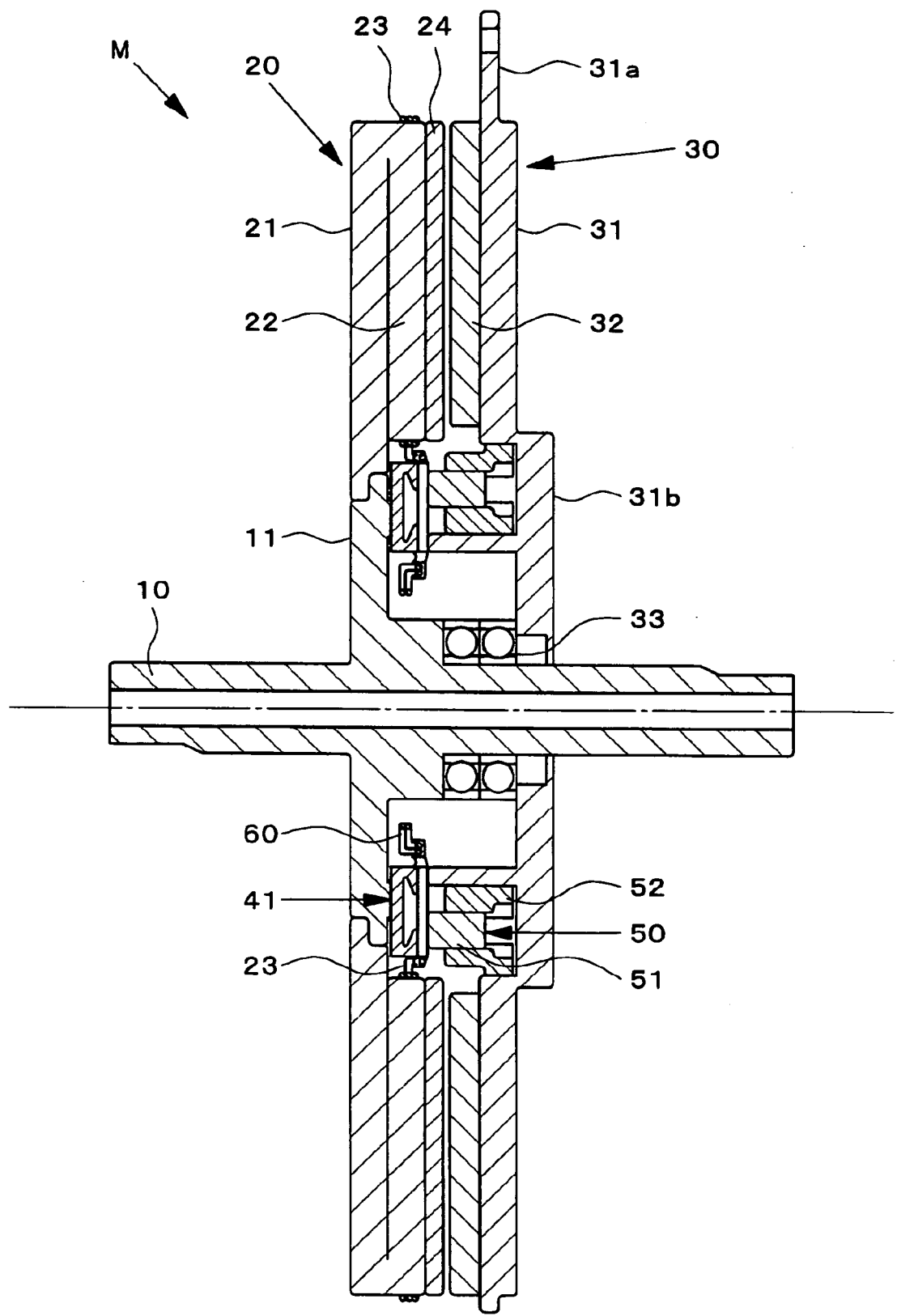
FIG. 2 is a cross sectional view along line II-II in FIG. 1.
Figure 3:
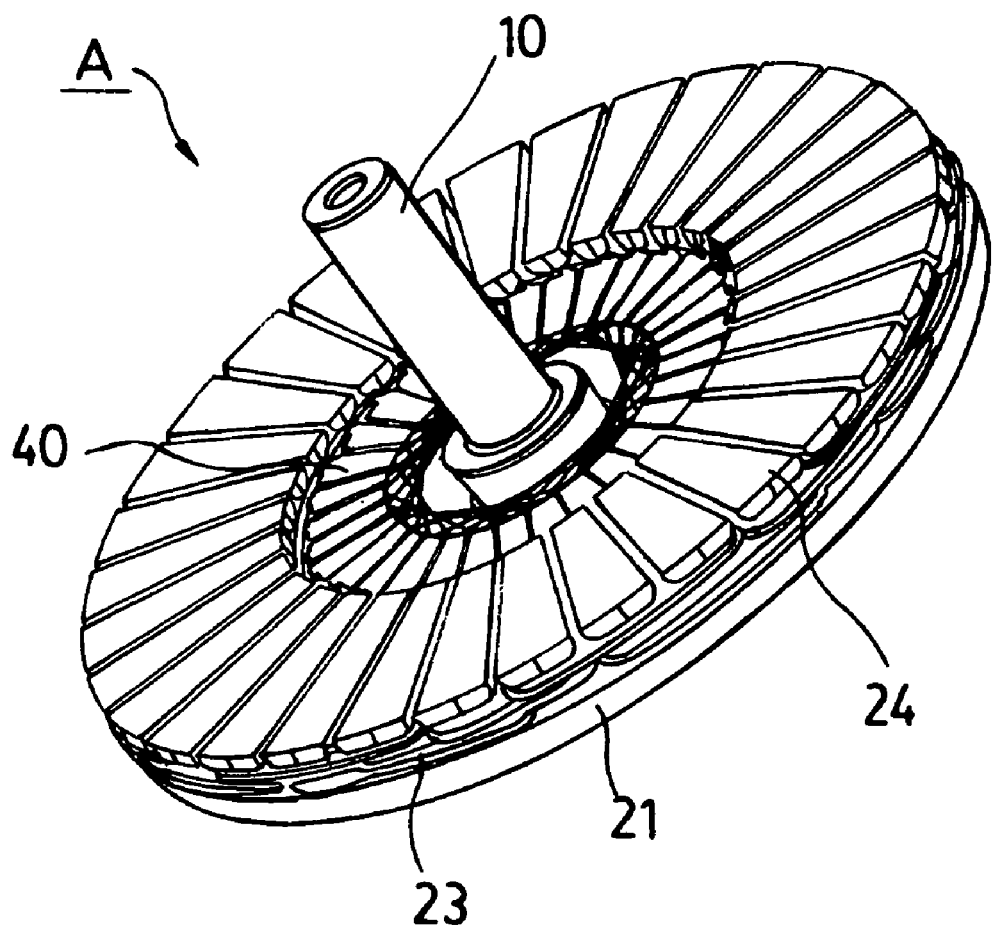
FIG. 3 is a perspective view of a rotor of the motor.

As shown in FIGS. 1 to 3, a motor M of the present embodiment includes a rotor A, a stator (field body) 30 and brush apparatuses 50. The rotor A includes a rotatable shaft (motor shaft) 10, an armature 20 and a commutator 40. The shaft 10 constitutes an output shaft of the motor M. The armature 20 is rotatably supported by the shaft 10. The commutator 40 rotates integrally with the armature 20. Each brush apparatus 50 includes a brush 51, which is slidably engaged with the commutator 40.

The motor M of the present embodiment is an example of an eight-pole axial-gap motor that is configured to have a relatively small thickness in the axial direction of the shaft 10 and thereby to have a relatively thin flat profile. Specifically, an outer shape of the armature 20 and of the stator 30 is configured into a generally disk shape. The armature 20 and the stator 30 are opposed to each other in the axial direction of the shaft 10 such that a predetermined air gap is provided therebetween.

The shaft 10 is rod-shaped. As shown in FIG. 2, a generally annular flange 11 radially outwardly protrudes from a predetermined location of the shaft 10 and has a predetermined cross sectional shape to install the armature 20 thereto. The flange 11 may be molded integrally with the shaft 10. Alternatively, a rod-shaped shaft member may be press fitted into the center of the disk shaped flange to have the configuration shown in FIG. 2.

As shown in FIGS. 2 and 3, the armature 20 includes a disk-shaped back yoke 21, a plurality of core teeth (protrusions) 22 and windings 23. The teeth 22 are provided on a plate surface of the back yoke 21. The windings 23 are wound around the corresponding teeth 22. The back yoke 21 and the teeth 22 are formed integrally by cutting and bending a single metal plate (magnetic steel plate).

The back yoke 21 is made from the plate, which has a predetermined thickness. An opening, which corresponds to the flange 11, is formed in the centre of the back yoke 21, so that the back yoke 21 has a doughnut shape. The flange 11 is securely fitted into the opening of the back yoke 21. In this way, the back yoke 21 is installed to the shaft 10 such that the plate surface of the back yoke 21 is generally perpendicular to the axial direction of the shaft 10. As a result, a back surface of the flange 11 and a back surface of the back yoke 21 are placed on a common plane, so that it is possible to achieve space saving.

Each tooth 22 is configured into a wedge shaped plate, which is placed on the plate surface of the back yoke 21 and has the predetermined thickness. Furthermore, the tooth 22 protrudes from the plate surface of the back yoke 21 in the axial direction of the shaft 10. In the present embodiment, the teeth 22 are placed on the plate surface of the back yoke 21 to radially extend from the center side where the shaft 10 is located, and a wedge shaped distal end of each tooth 22 is directed radially inward. A predetermined gap is formed between each circumferentially adjacent two teeth 22, and each winding 23, which is wound around the corresponding tooth 22, passes such a gap. A core plate 24, which is configured to cover the teeth 22 and the windings 23, contacts a top end surface of each tooth 22. Alternatively, one end portion (e.g., a radially inner end portion) of the core plate 24 may be joined to the back yoke 21 to form an integral housing, and the teeth 22 and the windings 23 may be placed in an interior of such a housing.

The respective windings 23 are wound around outer peripheral surfaces (side surfaces when seen in the axial direction) of the teeth 22 into a thin coil form. Furthermore, the windings 23 are wound in response to the exciting current of the multiple phases. Thereby, for example, the winding 23 of each phase is wound into a distributed winding pattern over two or more of the teeth 22. The winding 23 of each phase is electrically connected to each corresponding segment piece 43 of the commutator 40 described below.

In the motor M of the present embodiment, a sensor (not shown) is provided to sense a rotational position of the armature 20. The exciting current is supplied from an external power supply source (not shown) to the windings 23 based on the sensed rotational position of the armature 20, which is sensed with the sensor. Thereby, a rotational magnetic field is generated to stably rotate the armature 20. The armature 20 is assembled together with the shaft 10 and the commutator 40 and is thereby rotated together with the shaft 10 and the commutator 40 about the rotational axis of the shaft 10.

As shown in FIG. 2, the stator 30 includes a stator yoke 31, a plurality of planar magnets 32 and a bearing 33. The stator yoke 31 is a plate that is configured into a predetermined shape that corresponds to the outer shape of the armature 20. The magnets 32 are placed on a plate surface of the stator yoke 31 on the armature 20 side. The bearing 33 is provided in the center of the stator yoke 31. The stator yoke 31 is formed into the generally disk shape to correspond with the planar shape (cross sectional shape) of the armature 20. Yoke flanges 31*a* radially outwardly project at predetermined circumferential positions of the stator yoke 31 to fix the motor M to a predetermined external support member.

Each magnet 32 is configured into a thin plate body and is magnetized such that a magnetic flux thereof is directed in the plate thickness direction of the magnet 32. The magnets 32 are arranged one after another on the plate surface of the stator yoke 31 all around a recess 31b. The magnets 32 of one polarity and the magnets 32 of the other polarity are alternately arranged one after another in the circumferential direction to provide alternating magnetic poles. In the installed state where the stator 30 and the armature 20 are installed to the shaft 10, the locations of the magnets 32 correspond to the locations of the windings 23 of the armature 20. For example, in the present embodiment, the magnets of the one polarity and the magnets of the other polarity are alternately arranged one after another at 45 degree intervals to form the eight poles. The number of poles is set to correspond with the number and locations of the teeth 22 of the armature 20.

In the installed state where the stator 30 and the armature 20 are installed to the shaft 10, the magnets 32 are opposed to the windings 23 of the armature 20 such that a predetermined gap is provided between the magnets 32 and the windings 23. In the motor M, an induced electric power is generated by the interaction between the effective magnetic flux, which is applied from the magnets 32 to the windings 23 according to the gap, and the rotational magnetic field, which is generated by the exciting current that flows in the windings 23. Thus, a predetermined output torque is generated from the motor M.

In the present embodiment, the core plate 24 is provided between the magnets 32 and the windings 23. Therefore, at the time of manufacturing the motor M, the air gap between the magnets 32 and the core plate 24 is set to the predetermined size.

Figure 5:
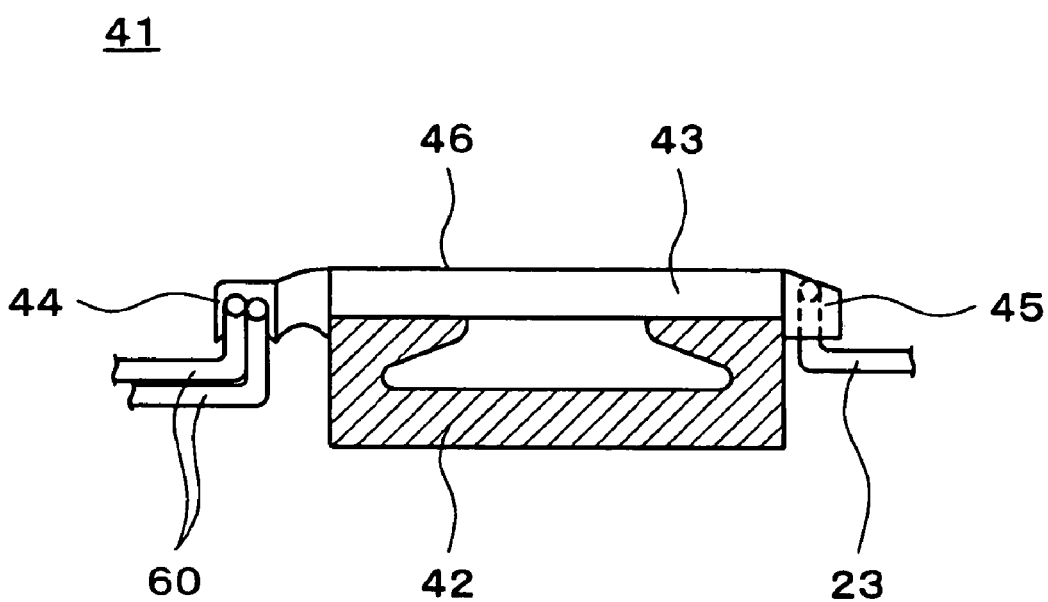
FIG. 5 is a schematic cross sectional view for describing the commutator.

In the present embodiment, the commutator 40 of the rotor A is installed to the stator 30 side axial surface of the flange 11, which is formed in the shaft 10. The commutator 40 of the present embodiment is a planar commutator. Specifically, the planar segments 41 are arranged one after another about the center of the shaft 10. As shown in FIG. 5, segments 41 are arranged such that a segment piece 43 of each segment 41 is supported over a base 42 made of a dielectric resin material and extends in the radial direction, and the segment pieces 43 of the segments 41 are arranged one after another in the circumferential direction to axially oppose the brushes 51 of the brush apparatuses 50. The segment pieces 43 are made of electrically conductive metal. The stator 30 side surfaces (surfaces perpendicular to the axial direction of the shaft 10) of the segment pieces 43 form slidably engaging surfaces 46. The brushes 51 are guided by brush holders 52, respectively, to slidably engage with the slidably engaging surfaces 46 of the segment pieces 43. A radial groove 47 is formed between each two adjacent slidably engaging surfaces 46 to electrically insulate between the adjacent segments 41.

Figure 4:
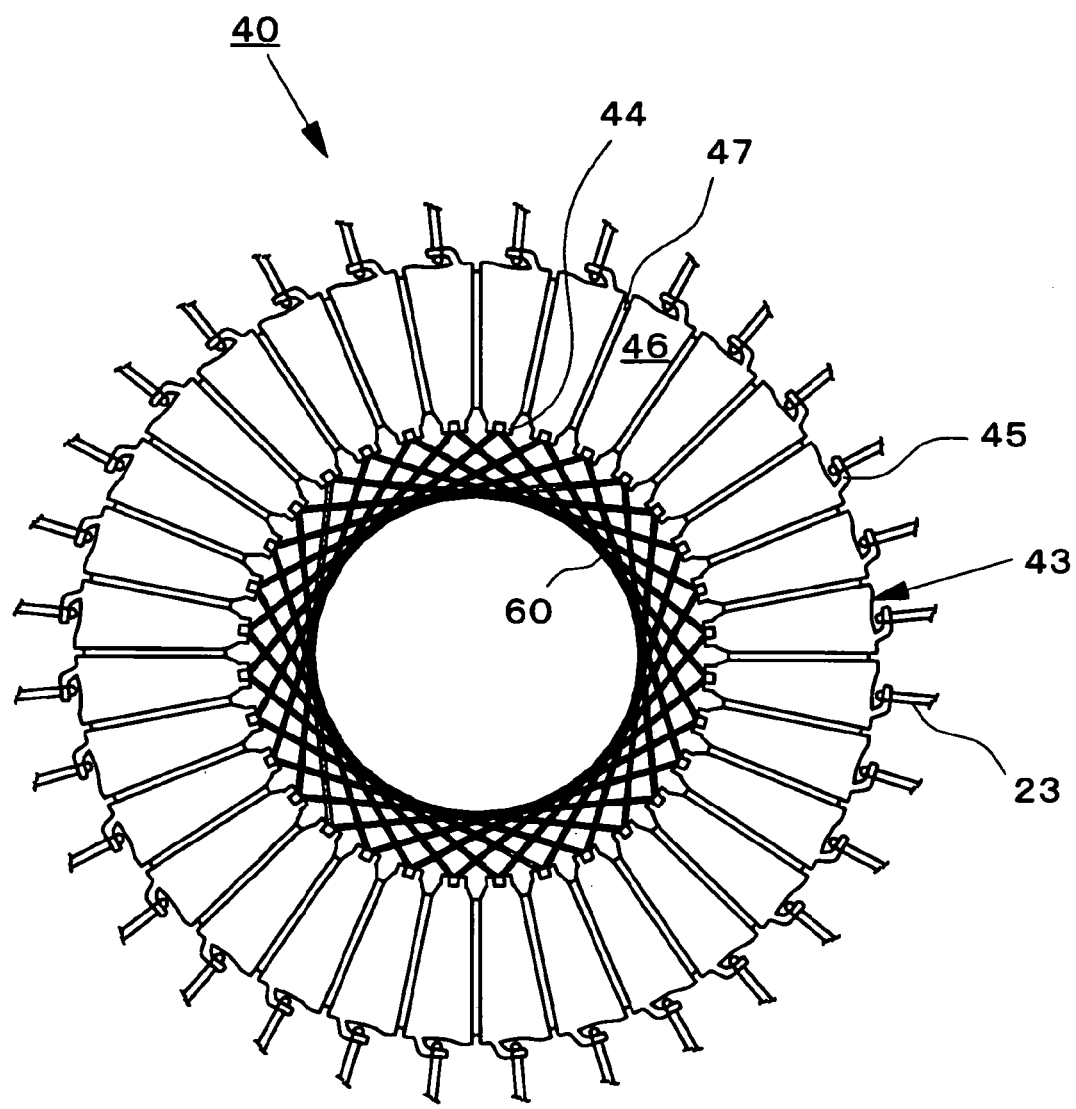
FIG. 4 is a schematic view for describing a commutator of the motor.

Now, a characteristic feature of the present embodiment will be described. Specifically, as shown in FIGS. 4 and 5, a radially inner engaging portion 44 radially inwardly protrudes from a radially inner end part of the segment piece 43, and a radially outer engaging portion 45 radially outwardly protrudes from a radially outer end part of the segment piece 43. The radially outer engaging portion 45 of each segment 41 serves as a riser, which is connected with the corresponding winding 23.

Short-circuit lines (conductive lines or equalizing lines) 60 are provided at a radially inner side of the commutator 40. Each short-circuit line 60 is an electrically conductive wire body coated with a dielectric film (thereby forming a coated wire) and connects between predetermined segment pieces 43, which need to have the same electric potential. The windings 23 and the short-circuit lines 60 are respectively joined to the corresponding segment pieces 43 by, for example, engaging the windings 23 and the short-circuit lines 60 to the corresponding engaging portions 44, 45 and thereafter fusing the windings 23 and the short-circuit lines 60 to the engaging portions 44, 45.

Figure 6:
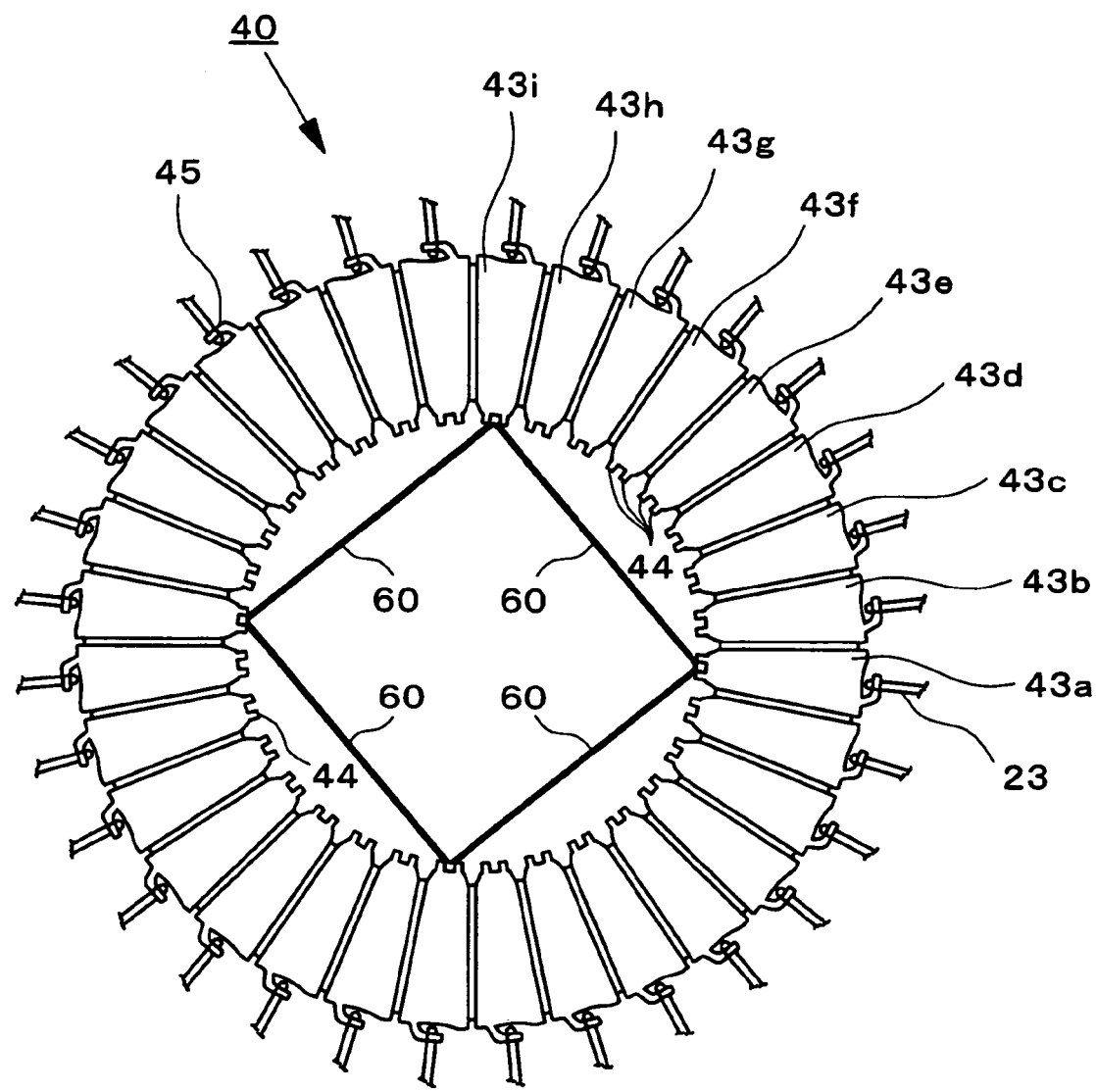
FIG. 6 is a schematic view for describing equalizing lines having the same electric potential.

Since the short-circuit lines 60, which are coated with the dielectric film, are used, it is possible to limit a flow of electric current between any adjacent short-circuit lines 60 even when the short-circuit lines 60 contact with each other at the time of short-circuiting between the corresponding segment pieces 43 at the radially inner side thereof. FIG. 6 shows an equalizing structure for implementing the same electric potential in the corresponding segment pieces 43, which are interconnected by the short-circuit lines 60 to have the same electric potential. Specifically, as shown in FIG. 6, since the eight pole motor is used in the present embodiment, the radially inner engaging portions 44 of corresponding four segment pieces 43, which are spaced from each other by other seven segment pieces 43 and need to have the same electric potential, are interconnected by the short-circuit lines 60 that are under the tension. Since the radially inner engaging portions 44 of the segment pieces 43 are interconnected by the short-circuit lines 60 under the tension (i.e., a tensile force being applied to each short-circuit line 60), it is possible to predict in advance each connecting point of the corresponding segment piece 43, which is connected with the short-circuit line 60.

Although this connection is made under the tension, each corresponding engaging portion 44 is connected with the exposed electrically conductive wire body of the short-circuit line 60, from which the dielectric film is removed (stripped). Furthermore, the short-circuit line 60 is connected to the corresponding engaging portion 44 while the tension is applied to the short-circuit line 60, so that the short-circuit line 60 is held under the tension along a corresponding straight line. Therefore, all of the short-circuit lines 60 are placed along the shortest distances, and the short-circuit lines 60 define a circular space at a location radially inward of the short-circuit lines 60. The shaft 10 is placed in this circular space, so that the available space can be effectively used. Upon installation of the shaft 10 into the circular space (generally circular space) defined by the short-circuit lines 60, an empty radial gap is left between the shaft 10 and the short-circuit lines 60 all around the shaft 10 to avoid contact of the shaft 10 with the short-circuit lines 60, as shown in FIG. 3.

As described above, the equalizing members (short-circuit lines) 60 are placed radially inward of the slidably engaging portions (segment pieces 43) of the commutator 40, which are slidably engaged with the brushes 51, so that the equalizing structure is constructed while the available space is effectively used without increasing the axial length.

Furthermore, the teeth 22 (having the windings 23 wound therearound), the commutator 40 and the short-circuit lines 60 are placed in a common plane, so that the available space can be effectively used. Thus, the equalizing structure can be implemented without sacrificing or increasing the axial length of the motor. Also, in each segment piece 43, the engaging portion 44, which is connected with the short-circuit line 60, is radially spaced from the engaging portion 45, which is connected with the winding 23. Thus, positioning of the winding 23 and positioning of the short-circuit line 60 are not complicated, so that the work efficiency and the reliability in the connecting work for connecting the winding 23 and the short-circuit line 60 to the segment piece 43 can be improved. Furthermore, since the short-circuit line 60 is placed radially inward of the segment piece 43, the length of the short-circuit line 60 can be made relatively short. Thus, the electrical conductivity can be improved, and thereby it is possible to implement the current supply with a relatively small loss. Furthermore, the brush apparatuses 50, each of which includes the brush 51 and the brush holder 52, is placed radially inward of the stator 30 (including the stator yoke 31 and the magnets 32) and of the core plate 24, so that the available space is effectively used to implement the space saving.

Figure 7:
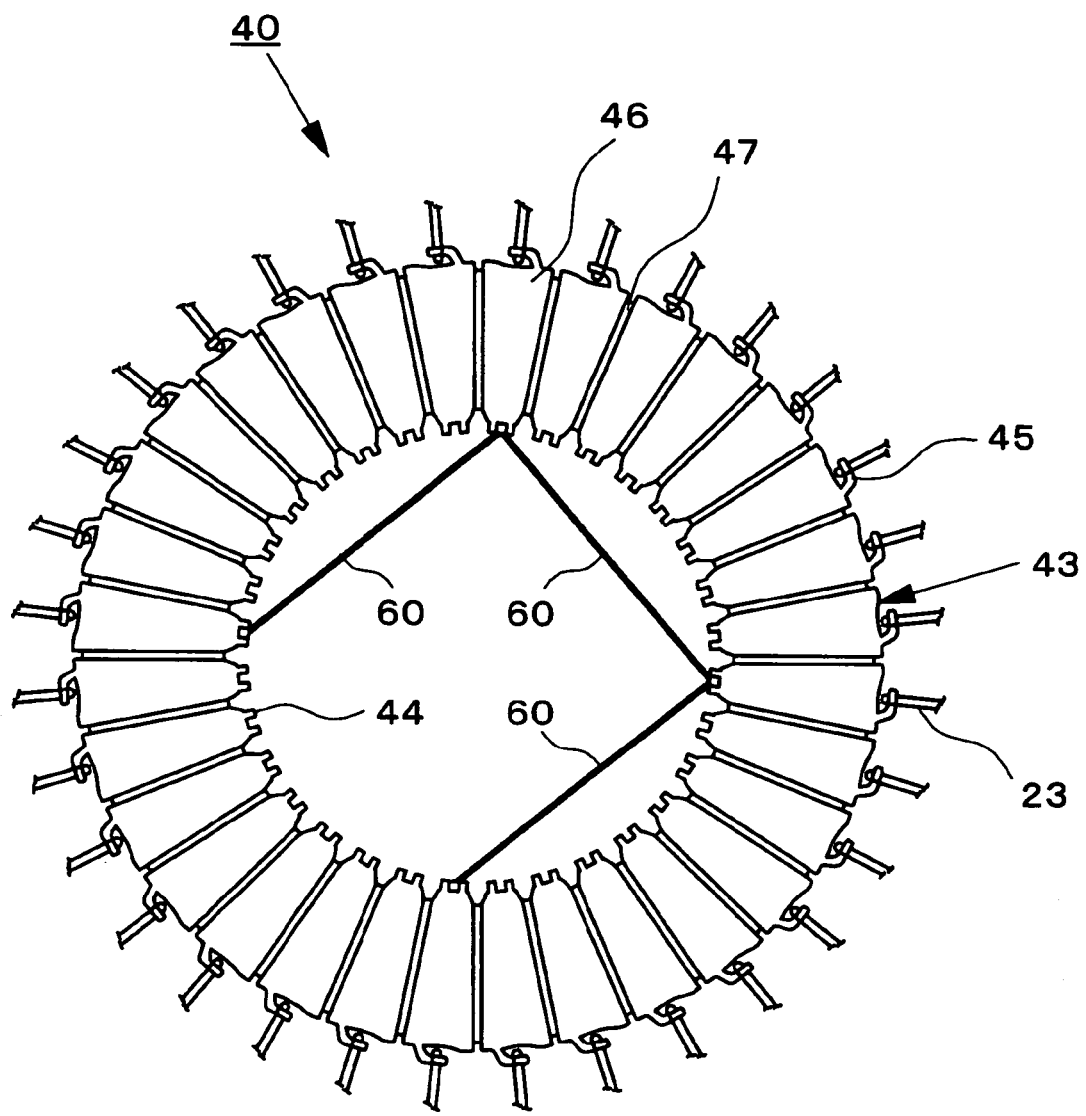
FIG. 7 is a schematic view showing a modification of equalizing lines of the first embodiment.

FIG. 7 is a descriptive diagram illustrating the short-circuit lines (equalizing lines), which have the same electric potential, in a modification of the above embodiment. Specifically, in FIG. 7, one of the short-circuit lines 60 is eliminated. Even with this modification of FIG. 7, advantages similar to those of the above embodiment discussed with reference to FIG. 6 can be achieved. Furthermore, in this modification, since the one of the short-circuit lines 60 is eliminated, it is possible to save the short-circuit lines 60 to reduce the manufacturing costs.

Returning back to the first embodiment, the cup-shape recess 31b is formed in the center of the above-described stator yoke 31. The bearing 33 is installed in the center of the recess 31b. A radial gap is formed between an inner peripheral surface of the recess 31b and an outer peripheral surface of the bearing 33, and the brush apparatuses 50 are placed in this radial gap. The brush apparatuses 50 are fixed to the stator 30. Thus, when the stator 30 is installed to the shaft 10, the brush apparatuses 50 are placed to axially oppose the commutator 40. When the rotor A is rotated relative to the stator 30, the segment pieces 43 of the commutator 40 slidably engage the brushes 51 of the brush apparatuses 50.

Second Embodiment

Figure 8:
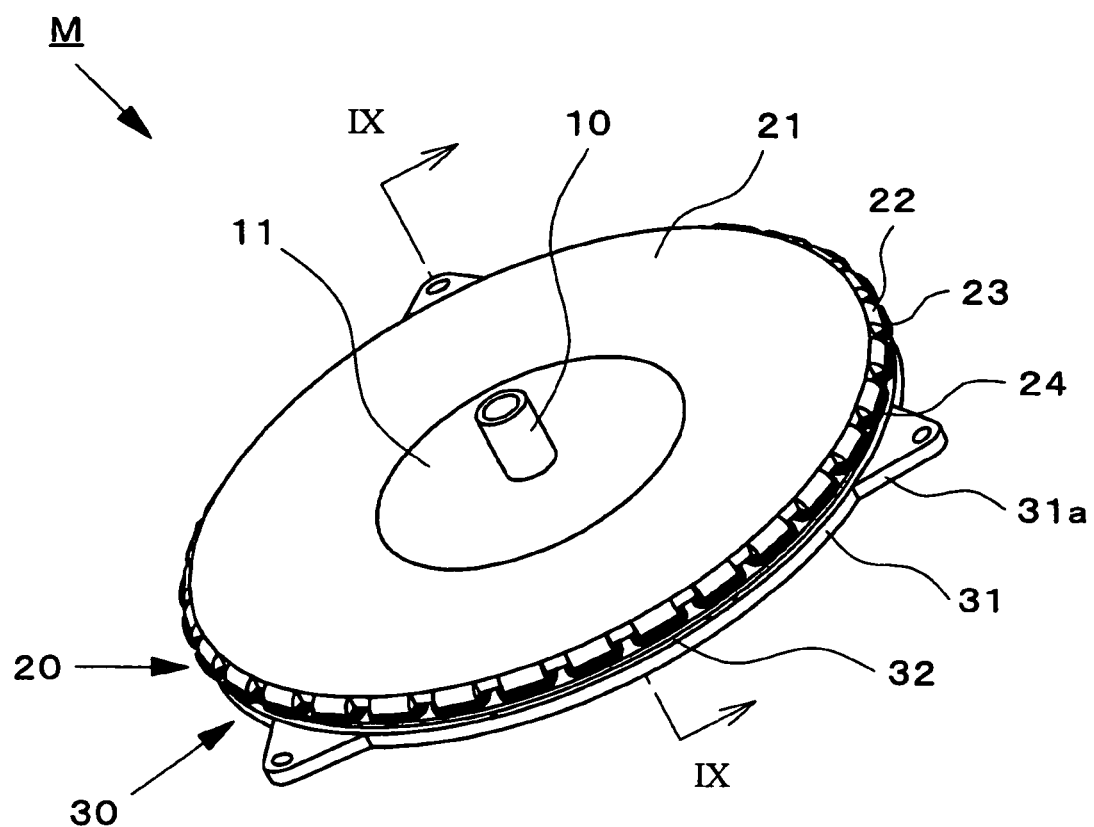
FIG. 8 is a perspective view of a motor according to a second embodiment of the present invention.
Figure 9:
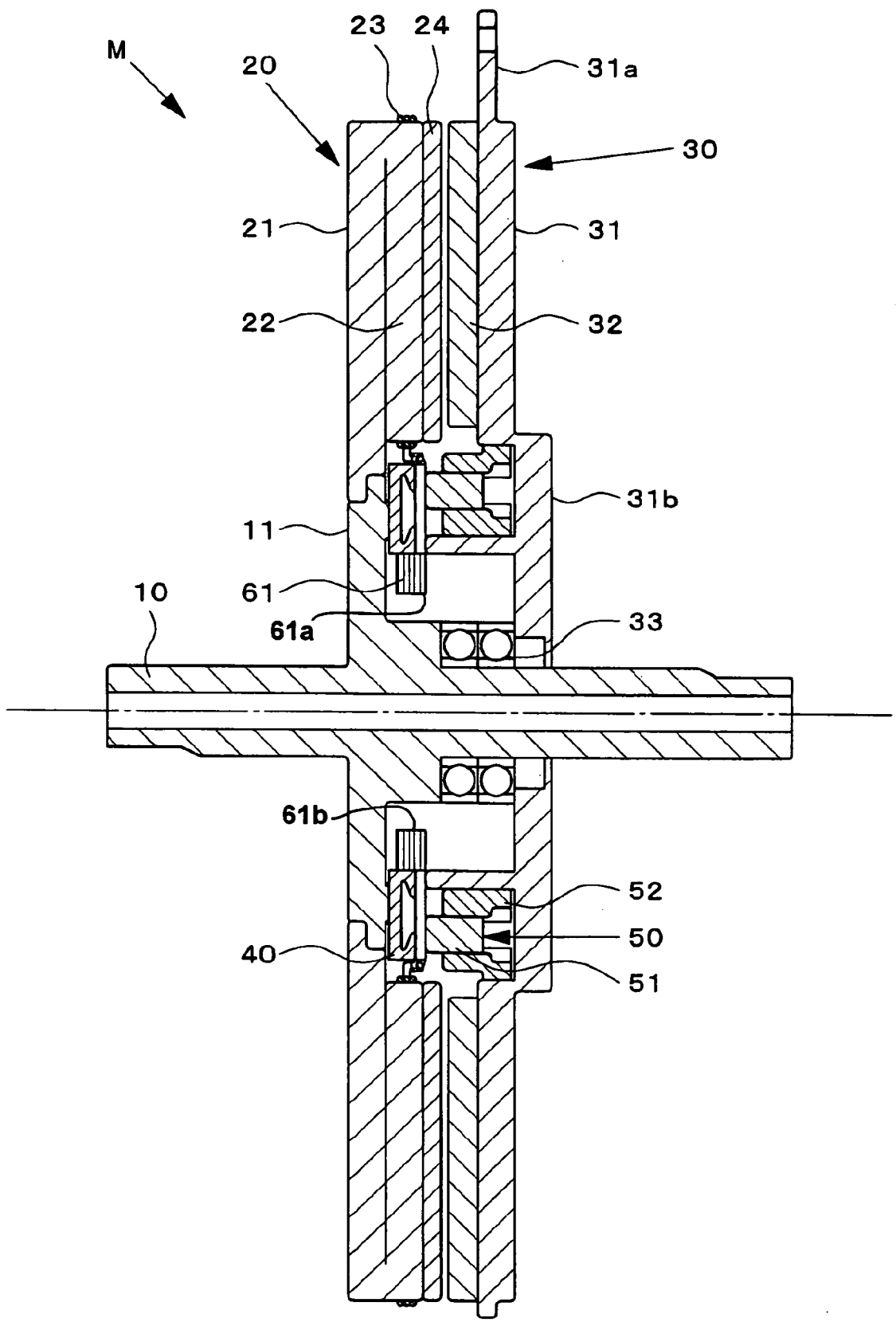
FIG. 9 is a cross sectional view along line IX-IX in FIG. 8.
Figure 10:
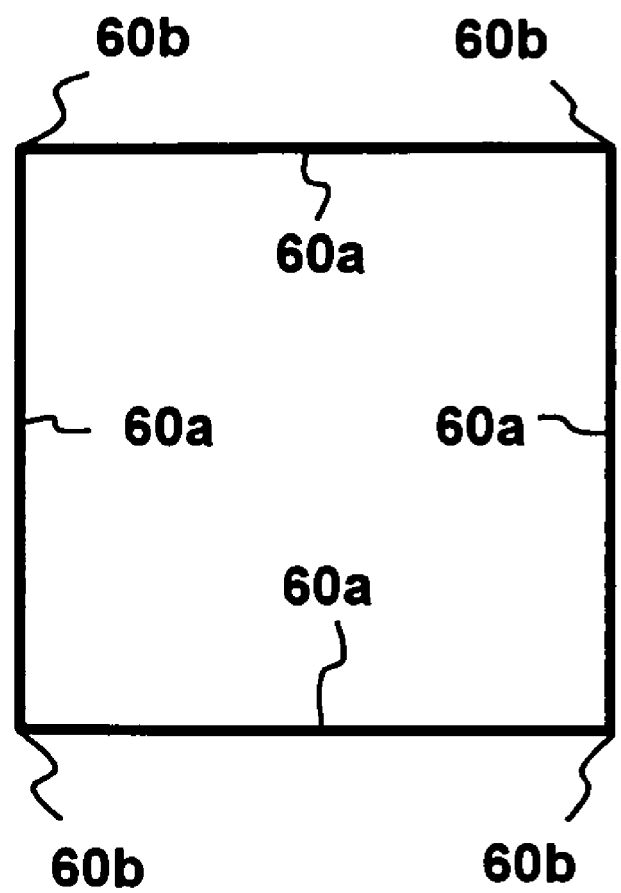
FIG. 10 is a circuit diagram showing short-circuit lines printed on a printed circuit board of a connector arrangement of the second embodiment.

Next, a second embodiment of the present invention will be described with reference to FIGS. 8 to 10. Here, components similar to those of the first embodiment will be indicated by the same reference numerals and will not be described further for the sake of simplicity. FIG. 8 shows the motor M of the second embodiment. In the second embodiment, with reference to FIG. 9, eight printed circuit boards (printed plates) 61a are stacked one after another in the axial direction to form a connector arrangement (copper plate assembly or copper strip assembly) 61, which has a center through hole 61b to receive the shaft 10 therethrough. The connector arrangement 61 is provided in place of the short-circuit lines 60 of the first embodiment. As shown in FIG. 10, which schematically depicts a circuit arrangement of one of the printed circuit boards 61a, four short-circuit lines (conductive lines or equalizing lines) 60a are printed on a surface of each printed circuit board 61a. Each adjacent two of the short-circuit lines 60a define an angle of about 90 degrees therebetween, so that the short-circuit lines 60a form a square shape. The short-circuit lines 60a may be printed as elongated copper plates or strips on the printed circuit board 61a. Four corners 60b of the square defined by the short-circuit lines 60a are connected with corresponding four of the engaging portions 44 of the segment pieces 43. Even in this case, the equalizing element or member (connector arrangement 61) is placed in the space, which is located radially inward of the commutator 40. Thus, advantages similar to those of the first embodiment can be achieved. Furthermore, it is only required to connect the connector arrangement 61 to the engaging portions 44 of the segment pieces 43, so that the assembling work is eased in comparison to the case where the wires are used to connect between the corresponding engaging portions 44. The above connector arrangement 61 includes the eight stacked printed circuit boards 61a, in each of which the four short-circuit lines 60a connected generally at 90 degrees are printed. However, the present invention is not limited to this. Alternatively, for example, the connector arrangement may include four stacked printed circuit boards, in each of which short-circuit lines connected generally at 45 degrees are printed. That is, the number of the stacked printed circuit boards may be changed based on the connecting angle of the short-circuit lines.

In the armature 20, the winding 23 of each phase is wound around the corresponding tooth 22 in the concentrated winding pattern.

As described above, the motor M of the present embodiment includes the planar rotor A (having the commutator 40), the brush apparatuses 50 (having the axially urged brushes 51) and the planar magnets 32 (providing the magnetic flux to the rotor A). The connector arrangement 61, which forms the equalizing structure, is placed in the space located radially inward of the commutator 40. The armature 20, which includes the planar core (core teeth 22) and the windings 23 wound therearound, is provided radially outward of the commutator 40 to generate the axial magnetic flux. In this way, the rotor A is formed.

With this structure, all of the components (e.g., the rotor and the stator) of the motor can be made generally planar, so that the planar motor can be obtained.

In each of the above embodiments, the windings 23 are provided to the rotor A side to form the armature, and the magnets 32 are provided to the stator 30 side. Alternatively, the windings 23 may be provided to the stator 30 side to form the armature, and the magnets 32 may be provided to the rotor A side.

Additional advantages and modifications will readily occur to those skilled in the art. The invention in its broader terms is therefore not limited to the specific details, representative apparatus, and illustrative examples shown and described.

What is claimed is:

1. A planar commutator for a direct current electric motor, comprising:

a plurality of segment pieces that are generally planar and are arranged one after another in a circumferential direction about a rotational axis of the planar commutator, wherein a slidably engaging surface of each segment piece, which is slidably engageable with a plurality of brushes of the direct current electric motor, extends in a plane that is generally perpendicular to the rotational axis, and each segment piece includes a radially inner engaging portion at a radially inner end part of the segment piece; and a plurality of conductive lines, each of which extends along a corresponding straight line and electrically interconnects between the radially inner engaging portions of corresponding two of the plurality of segment pieces to implement the same electric potential in the corresponding two of the plurality of segment pieces, wherein the plurality of conductive lines is held under tension and defines a generally circular space at a location radially inward of the plurality of conductive lines, and the generally circular space is adapted to receive a rotatable shaft therethrough while leaving an empty radial gap between the rotatable shaft and the plurality of conductive lines all around the rotatable shaft.

2. The planar commutator according to claim 1, wherein each of the plurality of conductive lines is a wire that is coated with a dielectric film therearound.

3. The planar commutator according to claim 1, wherein each segment piece further includes a radially outer engaging portion at a radially outer end part of the segment piece to connect with a corresponding one of a plurality of windings of the dielectric motor.

4. The planar commutator according to claim 1, wherein the plurality of conductive lines is provided in a connector arrangement that is placed radially inward of the plurality of segment pieces.

5. The planar commutator according to claim 4, wherein:
   the connector arrangement includes a plurality of printed circuit boards, which are stacked one after another in a direction parallel to the rotational axis; and
   each of the plurality of printed circuit boards includes corresponding four of the plurality of conductive lines, which are printed on the circuit board such that each adjacent two of the four conductive lines define an angle of about 90 degrees therebetween.

6. A rotor comprising:
   the planar commutator of claim 1, wherein each segment piece further includes a radially outer engaging portion at a radially outer end part of the segment piece;
   a rotatable shaft that is received through the generally circular space defined radially inward of the plurality of conductive lines while leaving an empty radial gap between the rotatable shaft and the plurality of conductive lines all around the rotatable shaft;
   an armature that includes a plurality of core teeth and is placed radially outward of the planar commutator, wherein the armature is rotated together with the planar commutator and the rotatable shaft; and
   a plurality of windings that are wound around the plurality of core teeth, wherein each winding is electrically connected to the radially outer engaging portion of each corresponding one of the plurality of segment pieces.

7. A direct current electric motor comprising:
   the rotor of claim 6;
   a plurality of brushes that are slidably engageable with the plurality of segment pieces; and
   at least one planar magnet that is radially opposed to the armature.

* * * * *